United States Patent
Hirota et al.

(10) Patent No.: US 12,087,514 B2
(45) Date of Patent: Sep. 10, 2024

(54) ELECTROLYTIC CAPACITOR AND PASTE FOR FORMING CONDUCTIVE LAYER OF ELECTROLYTIC CAPACITOR

(71) Applicant: Panasonic Intellectual Property Management Co., Ltd., Osaka (JP)

(72) Inventors: Kei Hirota, Okayama (JP); Keita Uenaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 122 days.

(21) Appl. No.: 17/760,001

(22) PCT Filed: Feb. 17, 2021

(86) PCT No.: PCT/JP2021/005825
§ 371 (c)(1),
(2) Date: Aug. 2, 2022

(87) PCT Pub. No.: WO2021/172123
PCT Pub. Date: Sep. 2, 2021

(65) Prior Publication Data
US 2023/0074619 A1    Mar. 9, 2023

(30) Foreign Application Priority Data
Feb. 28, 2020  (JP) .................. 2020-034465

(51) Int. Cl.
*H01G 9/042* (2006.01)
*H01G 9/048* (2006.01)
*H01G 9/15* (2006.01)

(52) U.S. Cl.
CPC ........... *H01G 9/0425* (2013.01); *H01G 9/048* (2013.01); *H01G 9/15* (2013.01)

(58) Field of Classification Search
None
See application file for complete search history.

(56) References Cited

U.S. PATENT DOCUMENTS

| | | | | |
|---|---|---|---|---|
| 5,005,107 A | * | 4/1991 | Kobashi | H01G 9/15 361/540 |
| 6,212,064 B1 | * | 4/2001 | Aoki | H01G 11/48 29/25.03 |

(Continued)

FOREIGN PATENT DOCUMENTS

| | | | | |
|---|---|---|---|---|
| JP | 2006332379 A | * | 12/2006 | ........... H01G 9/0036 |
| JP | 2007-305686 | | 11/2007 | |

(Continued)

OTHER PUBLICATIONS

International Search Report of PCT application No. PCT/JP2021/005825 dated May 18, 2021.

*Primary Examiner* — Eric W Thomas
(74) *Attorney, Agent, or Firm* — Rimon P.C.

(57) ABSTRACT

An electrolytic capacitor including a capacitor element. The capacitor element includes an anode body, a dielectric layer covering at least a part of the anode body, a solid electrolyte layer covering at least a part of the dielectric layer, and a cathode lead-out layer covering at least a part of the solid electrolyte layer. The cathode lead-out layer includes a conductive layer. An oxygen permeability of the conductive layer at a thickness of 10 μm is less than or equal to 7 cc/m²·day·atm.

12 Claims, 1 Drawing Sheet

(56) References Cited

U.S. PATENT DOCUMENTS

| | | | |
|---|---|---|---|
| 2008/0247120 A1 | 10/2008 | Mori et al. | |
| 2009/0195966 A1 | 8/2009 | Ozawa | |
| 2011/0017982 A1* | 1/2011 | Naito | H01G 11/48 257/40 |
| 2012/0075774 A1* | 3/2012 | Matsuoka | H01G 9/15 361/526 |
| 2021/0125787 A1 | 4/2021 | Iwaoka et al. | |

FOREIGN PATENT DOCUMENTS

| | | |
|---|---|---|
| JP | 2008-027998 | 2/2008 |
| JP | 2013-058793 | 3/2013 |
| WO | 2019/167774 | 9/2019 |

* cited by examiner

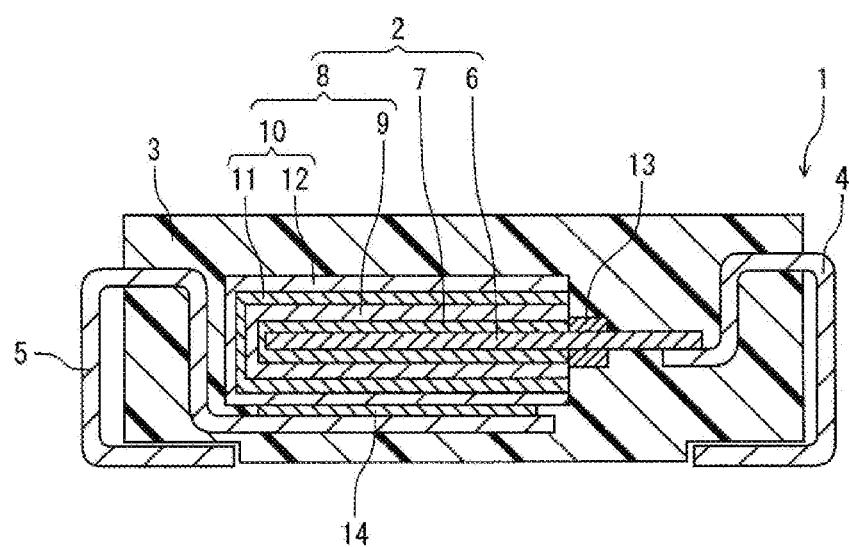

ELECTROLYTIC CAPACITOR AND PASTE FOR FORMING CONDUCTIVE LAYER OF ELECTROLYTIC CAPACITOR

TECHNICAL FIELD

The present disclosure relates to an electrolytic capacitor and a paste for forming a conductive layer of an electrolytic capacitor.

An electrolytic capacitor includes a capacitor element and an exterior body covering the capacitor element. Examples of the electrolytic capacitor include a solid electrolytic capacitor in which a conductive polymer or the like is used as a solid electrolyte. In this case, the capacitor element includes an anode body, a dielectric layer formed on the anode body, a solid electrolyte layer formed on the dielectric layer, and a cathode lead-out layer (carbon layer) formed on the solid electrolyte layer (for example, Unexamined Japanese Patent Publication No. 2008-27998).

SUMMARY

An electrolytic capacitor according to an aspect of the present disclosure includes a capacitor element, the capacitor element including an anode body, a dielectric layer covering at least a part of the anode body, a solid electrolyte layer covering at least a part of the dielectric layer, and a cathode lead-out layer covering at least a part of the solid electrolyte layer. The cathode lead-out layer includes a conductive layer. An oxygen permeability of the conductive layer at a thickness of 10 μm is less than or equal to 7 $cc/m^2 \cdot day \cdot atm$.

A paste for forming a conductive layer of an electrolytic capacitor according to another aspect of the present disclosure includes carbon particles having conductivity and a dispersion medium. An oxygen permeability of the conductive layer formed by the paste at a thickness of 10 μm is less than or equal to 7 $cc/m^2 \cdot day \cdot atm$.

The present disclosure can suppress an increase in the equivalent series resistance (ESR) of an electrolytic capacitor including a solid electrolyte layer.

BRIEF DESCRIPTION OF THE DRAWINGS

FIG. 1 is a sectional view schematically illustrating an electrolytic capacitor according to an exemplary embodiment of the present disclosure.

DESCRIPTION OF EMBODIMENT

Prior to the description of exemplary embodiments, problems in the conventional technology will be briefly described below.

In the electrolytic capacitor including a solid electrolyte layer, there is a case in which air (in particular, oxygen or oxygen and moisture) permeates the exterior body, and further permeates the cathode lead-out layer to contact the solid electrolyte layer and cause the conductive polymer contained in the solid electrolyte layer to deteriorate. Such deterioration of the conductive polymer becomes particularly remarkable under high temperature and/or high humidity. When the conductive polymer deteriorates, the resistance of the solid electrolyte layer increases, and the equivalent series resistance (ESR) of the electrolytic capacitor increases.

In view of the above problems, the present disclosure provides an electrolytic capacitor including a solid electrolyte layer in which an increase in the ESR can be suppressed, and a paste for forming a conductive layer of the electrolytic capacitor.

[Electrolytic Capacitor]

An electrolytic capacitor according to the present exemplary embodiment includes a capacitor element. The capacitor element includes an anode body, a dielectric layer covering at least a part of the anode body, a solid electrolyte layer covering at least a part of the dielectric layer, and a cathode lead-out layer covering at least a part of the solid electrolyte layer. The cathode lead-out layer includes a conductive layer, An oxygen permeability of the conductive layer at a thickness of 10 μm is less than or equal to 7 $cc/m^2 \cdot day \cdot atm$.

By covering the solid electrolyte layer with the cathode lead-out layer including the conductive layer having a high gas barrier property, which has an oxygen permeability of less than or equal to 7 $cc/m^2 \cdot day \cdot atm$ at a thickness of 10 contact between the solid electrolyte layer and air is inhibited. Thus, an increase in ESR associated with deterioration of the solid electrolyte layer due to the contact is suppressed.

The oxygen permeability of the conductive layer at a thickness of 10 μm may be less than or equal to 4 $cc/m^2 \cdot day \cdot atm$, or may be less than or equal to 2.5 $cc/m^2 \cdot day \cdot atm$.

From the viewpoint of reducing the ESR, the surface resistivity of the conductive layer may range from 10 Ω/sq. to 200 Ω/sq., inclusive, may range from 15 Ω/sq. to 100 Ω/sq., inclusive, or may range from 15 Ω/sq. to 60 Ω/sq., inclusive.

(Carbon Material)

The conductive layer preferably contains a particulate carbon material (hereinafter, also referred to as carbon particles) having conductivity. Hereinafter, the conductive layer containing the carbon material is also referred to as a carbon layer. Examples of the carbon material include graphite, graphene, carbon black, soft carbon, and hard carbon. As the graphite, a material having a graphite-type crystal structure is used, and the graphite may be either artificial graphite or natural graphite. As the carbon material, carbon nanotubes, carbon fibers, and the like, may be used. The carbon material may be obtained by cutting a fibrous carbon material such as a carbon nanotube or a carbon fiber into an appropriate length (including a pulverized product). These carbon materials may be used singly or in combination of two or more kinds of these materials.

The carbon particles may include spherical particles, but preferably include scaly particles. When the carbon particles are scaly particles, it is easy to pack the carbon particles in an overlapping layered state into the conductive layer. The densely formed conductive layer is likely to inhibit air from permeating the conductive layer. The carbon material that constitutes the particles is not limited to particular types as long as the carbon material has a scaly form, but graphite, graphene, and the like easily take a scaly form, and the scaly particles are easily obtained.

When the carbon particles include scaly particles, the average aspect ratio of the carbon particles may be more than or equal to 2 or may be more than or equal to 3. When the average aspect ratio of the carbon particles is within such a range, flat particles, such as scaly particles, are contained in a large quantity, and it is easy to pack the carbon particles in a stacked state into the conductive layer. With the densely formed conductive layer, air is likely to be inhibited from permeating the conductive layer. When the carbon particles include scaly particles, the upper limit of the aspect ratio of the carbon particles is, for example, 200.

The average aspect ratio of the carbon particles may be determined as follows.

An image of a section of the conductive layer or the carbon particles is obtained with a scanning electron microscope (SEM). A plurality (for example, 10) of carbon particles are arbitrarily selected from the obtained SEM image, maximum diameter D1 of each carbon particle is measured, and then maximum diameter D2 in a direction orthogonal to maximum diameter D1 is measured. For each carbon particle, the ratio of D1 to D2:D1/D2 is determined as an aspect ratio, and the aspect ratios of the selected carbon particles are averaged to calculate an average aspect ratio.

From the viewpoint of improving the gas barrier property and reducing the ESR, the average particle size of the carbon particles measured by a dynamic light scattering method preferably ranges from 0.1 µm to 30 µm, inclusive. When the average particle size of the carbon particles is less than or equal to 30 µm, air is likely to be inhibited from permeating the conductive layer. The contact area between the solid electrolyte layer and the carbon particles increases, and the interface resistance between the solid electrolyte layer and the cathode lead-out layer (conductive layer) is likely to be reduced. In addition, it is easy to densely pack the carbon particles into the conductive layer and to secure high conductivity. The average particle size of the carbon particles may range from 0.1 µm to 25 µm, inclusive.

From the viewpoint of the cost, improvement of the gas barrier property, and reduction of the ESR, the average particle size of the carbon particles more preferably ranges from 1 µm to 20 µm, inclusive, still more preferably ranges from 1 µm to 15 µm, inclusive, and particularly preferably ranges from 1 µm to 10 µm, inclusive when the carbon particles has a scaly form.

For example, when the conductive layer contains scaly carbon particles having an average particle size of less than or equal to 20 µm, the oxygen permeability at a thickness of 10 µm can be reduced to less than or equal to 4 cc/m$^2$·day·atm. In this case, the surface resistivity of the conductive layer ranges, for example, from 15 Ω/sq. 60 Ω/sq., inclusive. When the conductive layer contains scaly carbon particles having an average particle size of less than or equal to 15 µm, the oxygen permeability at a thickness of 10 µm can be reduced to less than or equal to 2.5 cc/m$^2$·day·atm.

The average particle size of the carbon particles is determined, for example, by obtaining a sample liquid in which the carbon particles are dispersed or a sample liquid in which a paste for forming a conductive layer, which is described later, is diluted, and measuring the sample liquid by a dynamic light scattering method with a particle size distribution measuring apparatus (ELS-Z manufactured by Otsuka Electronics Co., Ltd.). The average particle size of the carbon particles is a 50% cumulative value (median size) in a scattering intensity distribution obtained by a dynamic light scattering method.

The cathode lead-out layer may have a two-layer structure of a first conductive layer that covers at least a part of the solid electrolyte layer and a second conductive layer that covers at least a part of the first conductive layer. The first conductive layer may be composed of the conductive layer (carbon layer) containing the carbon particles described above, and the second conductive layer may be a silver-paste layer, which is described later.

(First Polymer)

The conductive layer may contain a polymer having an acid group (hereinafter, a first polymer) as an additive agent in addition to the carbon material. The conductive polymer contained in the solid electrolyte layer is easily positively charged by hole-doping. Specifically, for example, a —NH— group or a —N=group contained in polypyrrole or polyaniline, or a —S— group contained in polythiophene is easily present in the form of a —NH$_2^+$— group, a —NH$^+$=group, or a —S$^+$=group, respectively. The acid group of the first polymer binds to these positively charged functional groups, and thus, the first polymer may adhere to the conductive polymer. A polymer chain of the first polymer adheres to the surfaces of the carbon particles to be entangled, and thus, the first polymer may adhere to the carbon particles. As a result, the adhesion between the carbon particles and the conductive polymer is improved by interposing the first polymer. Consequently, permeation of the air through the conductive layer to the solid electrolyte layer is inhibited, and thus an increase in the ESR of the electrolytic capacitor due to deterioration of the conductive polymer is further suppressed.

When the carbon particles include scaly particles, the first polymer is likely to be interposed between the scaly particles overlapping each other, and the conductive layer and the solid electrolyte layer are likely to adhere to each other. Consequently, permeation of the air through the conductive layer to the solid electrolyte layer is likely to be inhibited, and the conductive polymer is likely to be suppressed from deteriorating.

Since the first polymer is thermally stable as compared with its monomer, the adhesion between the carbon material and the conductive polymer is likely to be maintained high even in a high-temperature environment. Hence, by including the first polymer in the conductive layer, an effect of suppressing an increase of the ESR even at a high temperature can be obtained.

The acid group may include at least one selected from the group consisting of a sulfone group (—SO$_3$H), a carboxyl group (—COOH), and derivatives thereof. The derivatives include an anion group from which a proton of the acid group is dissociated, a salt of the anion group and a cation (for example, sodium salt), and an ester form in which the acid group is reacted with an alcohol. The acid group is introduced into a monomer corresponding to a repeating unit of the first polymer. The number of acid groups contained in the first polymer may be more than or equal to 50 or may be more than or equal to 85 with respect to 100 monomers.

The content ratio of the first polymer may be more than or equal to 1 part by mass, more than or equal to 2 parts by mass, more than or equal to 5 parts by mass, or more than or equal to 10 parts by mass with respect to 100 parts by mass of the carbon material. By containing the first polymer at the content ratio of more than or equal to 1 part by mass with respect to 100 parts by mass of the carbon material, the adhesion between the cathode lead-out layer (carbon layer) and the solid electrolyte layer is improved and an increase in ESR of the electrolytic capacitor is suppressed. In contrast, when the content ratio of the first polymer is excessively large, the viscosity of the paste for forming a conductive layer increases. In addition, the resistance of the conductive layer increases, and the effect of suppressing an increase of the ESR may be offset. The content ratio of the first polymer is thus preferably less than or equal to 5000 parts by mass with respect to 100 parts by mass of the carbon material so that the workability of the carbon paste in coating is not impaired. The content ratio of the first polymer may be less than or equal to 1000 parts by mass or may be less than or equal to 100 parts by mass with respect to 100 parts by mass of the carbon material.

The content ratio of the first polymer may range from 1 part by mass to 5000 parts by mass, inclusive, may range from 2 parts by mass to 1000 parts by mass, inclusive, may range from 5 parts by mass to 100 parts by mass, inclusive, or may range from 10 parts by mass to 100 parts by mass, inclusive, with respect to 100 parts by mass of the carbon material.

The weight-average molecular weight of the first polymer is, for example, in a range from 2,000 to 1,000,000, inclusive. By using the first polymer having a molecular weight in such a range, the conductive layer and the solid electrolyte layer can adhere to each other, permeation of the air through the conductive layer to the solid electrolyte layer can decrease, and an increase in the ESR can be suppressed.

As the first polymer, for example, as an example having a sulfone group, both a polymer having an aromatic sulfonic acid in a monomer structure and a polymer having an aliphatic sulfonic acid in a monomer structure may be used. Examples of the polymer having an aromatic sulfonic acid in a monomer structure include polystyrenesulfonic acid and a phenolsulfonic acid novolac resin. Examples of the polymer having an aliphatic sulfonic acid in a monomer structure include polyvinylsulfonic acid and polyallylsulfonic acid. Examples of the first polymer having a carboxyl group (or a derivative thereof) include acrylic resins such as polyacrylic acid, polymethacrylic acid, polymethyl acrylate, and polymethyl methacrylate, and polyethylene terephthalate. As the first polymer, polyacrylicethyl sulfonic acid, polyacrylic butyl sulfonic acid, polymethacrylic sulfonic acid, poly-2-acrylamide-2-methylpropane sulfonic acid, or the like may also be used.

(Second Polymer)

The conductive layer may contain, as the additive agent in addition to the first polymer, a second polymer different from the first polymer. The second polymer can synergistically enhance the effect of suppressing an increase in the ESR or can have another function. Similarly to the first polymer, the second polymer may have an acid group. Meanwhile, the second polymer does not have to have an acid group.

The second polymer may have water solubility. The second polymer having water solubility easily binds to another second polymer or the first polymer by hydrogen bonding and easily has a dense structure by hydrogen bonding in the molecular chain. For this reason, a space for gas such as oxygen to diffuse in the polymer is small, and the gas hardly permeates the polymer. Consequently, the second polymer further inhibits the air from permeating through the conductive layer to the solid electrolyte layer and further suppress an increase in the ESR of the electrolytic capacitor.

Among water-soluble polymers, a cellulose-based polymer and polyvinyl alcohol have a high oxygen barrier property, and thus may be preferably used as the second polymer. The cellulose-based polymer may include cellulose ethers and cellulose esters, and may include, for example, a derivative in which a hydroxyl group of glucose, which is a monomer that constitutes cellulose, is chemically modified, such as carboxymethyl cellulose or hydroxyethyl cellulose.

The weight-average molecular weight of the second polymer is, for example, in a range from 2,000 to 1,000,000, inclusive. The content ratio of the second polymer is not limited, but may be, for example, less than or equal to 10 parts by mass with respect to 100 parts by mass of the carbon material in consideration of workability. Similarly to the first polymer, the second polymer may have an acid group. The content ratio of the second polymer may range from 5 parts by mass to 50 parts by mass, inclusive, may range from 5 parts by mass to 35 parts by mass, inclusive, may range from 8 parts by mass to 35 parts by mass, inclusive, or may range from 8 parts by mass to 32 parts by mass, inclusive, with respect to 100 parts by mass of the first polymer.

[Paste for Forming Conductive Layer of Electrolytic Capacitor]

The paste for forming a conductive layer of an electrolytic capacitor according to the present exemplary embodiment includes carbon particles having conductivity and a dispersion medium. An oxygen permeability of the conductive layer formed by a paste including carbon particles having conductivity (hereinafter, also referred to as carbon paste) is less than or equal to 7 $cc/m^2 \cdot day \cdot atm$ when the thickness of the conductive layer is 10 The surface resistivity of the conductive layer formed by the paste may range from 10 $\Omega$/sq. to 200 $\Omega$/sq., inclusive.

The oxygen permeability of the conductive layer is determined by the following method using the paste for forming a conductive layer.

The paste for forming a conductive layer is applied onto a film made of polyethylene terephthalate (PET), and dried (cured) by heating at 130° C. for 30 minutes to form a conductive layer having a thickness of 10 The oxygen permeability of the conductive layer formed on the PET film is determined with an oxygen permeability measurement device (for example, a measurement device manufactured by Hitachi High-Tech Science Corporation). Specifically, the oxygen permeability of a stacked body of the PET film and the conductive layer is measured, and the oxygen permeability of the conductive layer is determined by removing the oxygen permeability of the PET film from the measured value.

The surface resistivity of the conductive layer is determined by the following method using the paste for forming a conductive layer.

The paste for forming a conductive layer is applied onto a PET film with a bar coater and dried (cured) by heating at 130° C. for 30 minutes to form a conductive layer. The thickness of the conductive layer may be, for example, 10 $\mu$m. The surface resistivity of the formed conductive layer is measured by a four-point probe method.

As the carbon particles having conductivity, the above-described carbon particles contained in the conductive layer may be used. As the dispersion medium, water, an organic medium, or a mixture thereof is used. The paste may contain an additive agent, a binder, and/or the like as necessary. The paste may contain the first polymer as an additive agent or may contain the second polymer together with the first polymer.

The binder is not particularly limited, and examples thereof include known binders used for producing a conductive layer. As the binder, for example, a polymer binder, such as a thermoplastic resin (polyester resin or the like) or a thermosetting resin (polyimide resin, epoxy resin, or the like), is preferable.

As the additive agent, in addition to the first polymer and the second polymer, a known additive agent used for producing a conductive layer may be used. Examples of the additive agent include a dispersant, a surfactant, an antioxidant, a preservative, a base, and/or an acid.

Hereinafter, a configuration of the electrolytic capacitor will be described more specifically with reference to the drawing as appropriate. FIG. 1 is a sectional view schematically illustrating a structure of the electrolytic capacitor according to the present exemplary embodiment. In the illustrated example, electrolytic capacitor 1 includes capacitor element 2, resin exterior body 3 that seals capacitor element 2, and anode lead terminal 4 and cathode lead terminal 5 at least parts of which are respectively exposed outside exterior body 3. Exterior body 3 has a substantially rectangular parallelepiped outer shape, and electrolytic capacitor 1 also has a substantially rectangular parallelepiped outer shape.

Capacitor element 2 includes anode body 6 that constitutes an anode part, dielectric layer 7 that covers anode body 6, and cathode part 8 that covers dielectric layer 7.

Anode body 6 includes a region facing cathode part 8 and a region not facing the cathode part. In the region of anode body 6 that does not face cathode part 8, insulating separation layer 13 is formed in a part adjacent to cathode part 8 to cover a surface of anode body 6 in a band shape, so that contact between cathode part 8 and anode body 6 is restricted. In the region of anode body 6 that does not face cathode part 8, the other part is electrically connected to anode lead terminal 4 by welding. Cathode lead terminal 5 is electrically connected to cathode part 8 through adhesive layer 14 made of a conductive adhesive.

Cathode part 8 includes solid electrolyte layer 9 covering dielectric layer 7, and cathode lead-out layer 10 covering solid electrolyte layer 9. Cathode lead-out layer 10 has carbon layer 11 and silver-paste layer 12. Carbon layer 11 is composed of the above-described conductive layer. In this configuration, even when air enters exterior body 3, contact of the air to solid electrolyte layer 9 is inhibited and deterioration of the conductive polymer contained in solid electrolyte layer 9 is suppressed.

Hereinafter, the configuration of the electrolytic capacitor will be described in more detail.

(Capacitor Element 2)

Capacitor element 2 includes anode body 6 that constitutes an anode part, dielectric layer 7, and cathode part 8 including solid electrolyte layer 9. Cathode part 8 includes solid electrolyte layer 9 and cathode lead-out layer 10 covering solid electrolyte layer 9.

The electrolytic capacitor only needs to have at least one capacitor element 2 and may have one capacitor element 2 or a plurality of capacitor elements. The number of capacitor elements included in the electrolytic capacitor may be determined in accordance with application.

(Anode Body 6)

Anode body 6 may include a valve metal, an alloy containing a valve metal, a compound containing a valve metal, or the like. These materials may be used singly or in combination of two or more thereof. As the valve metal, for example, aluminum, tantalum, niobium, and titanium are preferably used. Anode body 6 having a porous surface may be obtained, for example, by roughening a surface of a base material (such as a foil-shaped or plate-shaped base material) containing a valve metal by etching or the like. Alternatively, anode body 6 may be a molded body of particles containing a valve metal or a sintered body thereof. A sintered body has a porous structure. That is, when anode body 6 is a sintered body, entire anode body 6 may be porous.

(Dielectric Layer 7)

Dielectric layer 7 is formed by anodizing the valve metal of the surface of anode body 6 by an anodizing treatment or the like. Dielectric layer 7 only needs to be formed to cover at least a part of anode body 6. Dielectric layer 7 is usually formed on the surface of anode body 6. Since dielectric layer 7 is formed on the porous surface of anode body 6, the dielectric layer is formed along inner wall faces of holes and hollows (pits) in the surface of anode body 6.

Dielectric layer 7 contains an oxide of a valve metal. For example, when tantalum is used as the valve metal, the dielectric layer contains $Ta_2O_5$, and when aluminum is used as the valve metal, the dielectric layer contains $Al_2O_3$. Dielectric layer 7 is not limited thereto and may be any one that functions as a dielectric material. When the surface of anode body 6 is porous, dielectric layer 7 is formed along the surface (including the inner wall faces of the holes) of anode body 6.

(Cathode Part 8)

Solid electrolyte layer 9 that constitutes cathode part 8 contains a conductive polymer and may also contain a dopant, an additive agent, or the like as necessary. Examples of the conductive polymer that may be used include polypyrrole, polythiophene, polyaniline, polyacetylene, polyphenylene, polyphenylene vinylene, polyacene, and/or polythiophene vinylene, and derivatives of these polymers.

(Solid Electrolyte Layer 9)

Solid electrolyte layer 9 may be formed, for example, by chemically and/or electrolytically polymerizing a raw material monomer on dielectric layer 7. Alternatively, the solid electrolyte layer may be formed by bringing a solution in which the conductive polymer is dissolved or a dispersion liquid in which the conductive polymer is dispersed into contact with dielectric layer 7. Solid electrolyte layer 9 only needs to be formed to cover at least a part of dielectric layer 7.

(Cathode Lead-Out Layer 10)

Cathode lead-out layer 10 that constitutes cathode part 8 includes carbon layer 11 and silver-paste layer 12. Cathode lead-out layer 10 is formed to cover at least a part of solid electrolyte layer 9.

(Carbon Layer 11)

Carbon layer 11 contains the carbon particles described above and may contain a binder, an additive agent, and/or the like as necessary. Carbon layer 11 may contain the first polymer described above as an additive agent or may contain the second polymer together with the first polymer.

The average thickness of carbon layer 11 ranges, for example, from 0.01 μm to 50 μm, inclusive. The average thickness may be obtained, for example, by measuring and averaging thicknesses of a plurality of points (for example, 10 points) of carbon layer 11 in a SEM image of a section of carbon layer 11.

As the binder and the additive agent contained in carbon layer 11, known components to be used in a carbon layer of an electrolytic capacitor may be used without particular limitation. Carbon layer 11 may contain a metal element such as silver.

(Silver-Paste Layer 12)

Silver-paste layer 12 contains, for example, silver particles and a binder. The silver particles may contain other metal elements. The content proportion of other metal elements in the silver particles is preferably less than or equal to 0.1 mass %.

The content proportion of silver in silver-paste layer 12 is, for example, more than 50 mass %, and preferably more than or equal to 70 mass %. When the content proportion of the silver is within such a range, high conductivity of silver-paste layer 12 is ensured, and thus a current collecting property from capacitor element 2 can be enhanced.

The binder contained in silver-paste layer 12 is not particularly limited, but a cured product of a curable resin is preferable. Examples of the curable resin include thermosetting resins such as an epoxy resin.

Silver-paste layer 12 may contain an additive agent and the like as necessary.

Examples of the additive agent include known additive agents to be used in a silver-paste layer. Silver-paste layer 12 may contain the first polymer and/or the second polymer described above.

(Exterior Body 3)

Exterior body 3 covers capacitor element 2. Usually, parts of lead terminals 4 and 5 are also covered with exterior body 3. Exterior body 3 is formed by sealing capacitor element 2 and parts of lead terminals 4 and 5 with a resin material.

Exterior body 3 preferably contains a cured product of a curable resin composition and may contain a thermoplastic resin or a composition containing a thermoplastic resin. As the curable resin composition and the thermoplastic resin (composition), the compositions described later may be used.

In exterior body 3 made of a resin material, the resin material easily deteriorates or becomes damaged by a mechanical shock, and external air easily permeates exterior body 3 to enter the exterior body. The present exemplary embodiment, in which the cathode lead-out layer has a high gas barrier property, can inhibit air from contacting solid electrolyte layer 9 even when exterior body 3 made of a resin material is used.

(Lead Terminals 4, 5)

One ends of lead terminals 4, 5 are electrically connected to capacitor element 2, and the other ends are drawn out of exterior body 3. In electrolytic capacitor 1, one end sides of lead terminals 4, 5 are covered with exterior body 3 together with capacitor element 2. As lead terminals 4, 5, a lead terminal to be used in an electrolytic capacitor may be used without particular limitation, and for example, a lead terminal called a lead frame may be used. Examples of the material of lead terminals 4, 5 include a metal such as copper and an alloy thereof.

[Method for Manufacturing Electrolytic Capacitor]

The electrolytic capacitor described above is manufactured by a manufacturing method including a step of forming a dielectric layer to cover at least a part of an anode body, a step of forming a solid electrolyte layer to cover at least a part of the dielectric layer, and a step of forming a cathode lead-out layer on at least a part of the solid electrolyte layer. The step of forming the cathode lead-out layer includes a step of forming a carbon layer, and a step of forming a silver-paste layer on at least a part of the carbon layer. The method for manufacturing the electrolytic capacitor may further include, before the step of forming the dielectric layer, a step of providing the anode body. In addition, the method for manufacturing the electrolytic capacitor may further include a step of electrically connecting lead terminals to the capacitor element, and a step of covering the capacitor element and parts of the lead terminals with an exterior body (sealing step).

Hereinafter, each step will be described in more detail.

(Step of Providing Anode Body 6)

In this step, anode body 6 that constitutes an anode part is formed by a known method in accordance with the type of anode body 6.

Anode body 6 may be provided, for example, by roughening a surface of a foil-shaped or plate-shaped base material containing a valve metal. The roughening only needs to form irregularities on the surface of the base material, and may be performed, for example, by etching (for example, electrolytically etching) the surface of the base material.

This step is not limited to the above case, and alternatively, a powder of the valve metal is molded into a desired shape (for example, a block shape) to obtain a molded body. Anode body 6 having a porous structure may be formed by sintering this molded body.

(Step of Forming Dielectric Layer 7)

In this step, dielectric layer 7 is formed on anode body 6. Dielectric layer 7 is formed by anodizing anode body 6. The anodization may be performed by a known method such as an anodizing treatment. The anodizing treatment may be performed, for example, by immersing anode body 6 in an anodizing liquid to impregnate the surface of anode body 6 with the anodizing liquid, and applying a voltage between anode body 6 as an anode and a cathode immersed in the anodizing liquid. As the anodizing liquid, for example, a phosphoric acid aqueous solution or the like is preferably used.

(Step of Forming Solid Electrolyte Layer 9)

In this step, solid electrolyte layer 9 is formed on dielectric layer 7. Solid electrolyte layer 9 is formed, for example, by electrolytically polymerizing a raw material monomer of a conductive polymer on dielectric layer 7. Anode body 6 on which dielectric layer 7 is formed is immersed in a polymerization liquid prepared by mixing a raw material monomer and a dopant in advance and further adding a solvent, a polymerization initiation electrode is brought close to a surface of anode body 6 in the polymerization liquid, a cathode is provided at a position facing anode body 6 away from anode body 6, and a voltage is applied between the polymerization initiation electrode and the cathode to perform electrolytic polymerization. Examples of the raw material monomer to be used include pyrrole, thiophene, aniline, acetylene, phenylene, phenylenevinylene, acene, and/or thiophenevinylene, and derivatives thereof. Examples of the solvent include water, an organic solvent, and a mixture thereof.

Solid electrolyte layer 9 may also be formed by attaching a treatment liquid containing a conductive polymer to anode body 6 on which dielectric layer 7 is formed, and then drying the treatment liquid. The treatment liquid may further contain another component such as a dopant. As the conductive polymer, for example, poly(3,4-ethylenedioxythiophene) (PEDOT) is used. As the dopant, for example, polystyrenesulfonic acid (PSS) is used. The treatment liquid is, for example, a dispersion liquid or solution of the conductive polymer. Examples of the dispersion medium (solvent) include water, an organic solvent, and a mixture thereof. Solid electrolyte layer 9 may be formed by chemically polymerizing a raw material monomer of the conductive polymer on dielectric layer 7.

(Step of Forming Cathode Lead-Out Layer 10)

In this step, cathode lead-out layer 10 is formed on solid electrolyte layer 9 by sequentially stacking carbon layer 11 and silver-paste layer 12.

(Step of Forming Carbon Layer 11)

In this step, the paste (carbon paste) for forming a conductive layer described above is attached to at least a part of solid electrolyte layer 9 to form carbon layer 11. Carbon layer 11 may be formed by further heating a coated film of the carbon paste formed on at least a part of solid electrolyte layer 9.

Carbon layer 11 may be formed by attaching the carbon paste to at least a part of solid electrolyte layer 9 to form a coated film and then drying the coated film. After the coated film is formed, the coated film may be further heated. The temperature at which the coated film of the carbon paste is heated ranges, for example, from 150° C. to 300° C., inclusive.

The carbon paste only needs to be brought into contact with solid electrolyte layer 9, and, for example, anode body 6 including solid electrolyte layer 9 may be immersed in the carbon paste, or the carbon paste may be applied onto the surface of solid electrolyte layer 9 with a known coater or the like.

(Step of Forming Silver-Paste Layer 12)

In this step, silver-paste layer 12 is formed on at least a part of carbon layer 11. Silver-paste layer 12 may be formed by attaching a silver paste to at least a part of carbon layer 11. The silver paste may contain silver particles, a binder, a dispersion medium, and, as necessary, an additive agent. For the silver particles, the binder, and the additive agent, refer to the description of silver-paste layer 12. The first polymer and/or the second polymer may be contained in the silver paste. Examples of the dispersion medium include water, an organic medium, and a mixture thereof.

Silver-paste layer 12 may be formed by drying and/or heating a coated film of the silver paste formed on at least a part of carbon layer 11. For example, when a thermosetting resin is used as the binder, silver-paste layer 12 is formed by heating the coated film of the silver paste to cure the binder.

(Step of Connecting Lead Terminal)

In this step, anode lead terminal 4 and cathode lead terminal 5 are electrically connected to capacitor element 2. The connecting of each lead terminal may be performed after capacitor element 2 is produced. The connecting of cathode lead terminal 5 to capacitor element 2 is performed after capacitor element 2 is produced, but the connecting of anode lead terminal 4 to anode body 6 may be performed at an appropriate stage of the step of producing capacitor element 2. For example, when an anode body having a porous structure is formed by sintering, a molded body molded into a desired shape is obtained with one end in the longitudinal direction of a rod-shaped anode lead terminal being embedded in the powder of the valve metal. The anode body having a porous structure, in which one end of the anode lead terminal is embedded, may be formed by sintering the molded body.

When a stacked body of a plurality of capacitor elements is used, anode lead terminal 4 may be connected to anode body 6 in the same manner as described above. Cathode lead terminal 5 may be connected to the capacitor element in the same manner as described above, or one end of cathode lead terminal 5 may be connected to the stacked body of the plurality of capacitor elements in which cathode parts 8 are electrically connected to each other.

(Sealing Step)

In this step, capacitor element 2 is sealed with exterior body 3 by covering capacitor element 2 and parts of lead terminals 4, 5 with exterior body 3. More specifically, the sealing may be performed by covering capacitor element 2 and parts of lead terminals 4, 5 with a resin constituting the resin exterior body after capacitor element 2 and lead terminals 4, 5 are electrically connected.

Exterior body 3 may be formed by a molding technique such as injection molding, insert molding, or compression molding. Exterior body 3 may be formed, for example, using a predetermined mold, by packing a curable resin composition or a thermoplastic resin (composition) into predetermined portions to cover capacitor element 2 and one ends of lead terminals 4, 5. When a stacked body of a plurality of capacitor elements is used, the resin exterior body may be formed to cover the stacked body and parts of the lead terminals.

The curable resin composition may contain a filler, a curing agent, a polymerization initiator, a catalyst, and/or the like, in addition to a curable resin. Examples of the curable resin include epoxy resin, phenol resin, urea resin, polyimide, polyamide-imide, polyurethane, diallyl phthalate, and unsaturated polyester. The curable resin composition may contain a plurality of curable resins.

As the filler, for example, (inorganic and organic) insulating particles, fibers, and/or the like are preferable. Examples of an insulating material that constitutes the filler include insulating compounds (for example, oxides) such as silica and alumina, glass, and mineral materials (talc, mica, clay, and the like). The resin exterior body may contain one type of these fillers or may contain two or more types of these fillers in combination. The content proportion of the filler in the resin exterior body may range, for example, from 10 mass % to 90 mass %, inclusive.

As the thermoplastic resin, for example, polyphenylene sulfide (PPS), polybutylene terephthalate (PBT), or the like may be used. The composition containing the thermoplastic resin may contain the above-described fillers and the like in addition to the thermoplastic resin.

EXAMPLES

Hereinafter, the present disclosure will be specifically described based on Examples. However, the present disclosure is not limited to the following Examples.

Examples 1 to 5

Electrolytic capacitor 1 illustrated in FIG. 1 was produced in the following manner, and properties of electrolytic capacitor 1 were evaluated.

(1) Production of Capacitor Element

An aluminum foil (thickness: 100 μm) was provided as a base material, and a surface of the aluminum foil was subjected to an etching treatment to obtain anode body 6. Anode body 6 was immersed in a phosphoric acid solution (liquid temperature: 70° C.) having a concentration of 0.3 mass % and subjected to a direct-current voltage of 70 V for 20 minutes, whereby dielectric layer 7 containing aluminum oxide ($Al_2O_3$) was formed on the surface of anode body 6. Thereafter, an insulating resist tape (separation layer 13) was attached to a predetermined portion of anode body 6.

Anode body 6 on which dielectric layer 7 was formed and a counter electrode were immersed in a polymerization liquid containing pyrrole as a raw material monomer of a conductive polymer, and electrolytic polymerization was performed at a polymerization liquid temperature of 25° C. and a polymerization voltage of 3 V, then a film-like polymer formed on dielectric layer 7 was washed with water. Solid electrolyte layer 9 containing polypyrrole was thus formed on dielectric layer 7.

A carbon material, the first polymer, and the second polymer were dispersed in water to obtain a carbon paste. The pH of the carbon paste was adjusted to 5 with aqueous ammonia.

As the carbon material, scaly natural graphite powders having average particle sizes shown in Table 1 were used. The average particle sizes were determined by the method described above. With respect to the scaly natural graphite powders having the average particle sizes shown in Table 1, the average aspect ratios determined by the method described above were all more than or equal to 2.

As the first polymer, a phenol sulfonic acid novolac resin (weight-average molecular weight: 30,000) was used. A sodium salt of the phenol sulfonic acid novolac resin having 100 acid groups (sulfone groups) per 100 monomers was used. As the second polymer, carboxymethyl cellulose (CMC) (weight-average molecular weight: 100,000) was used. An ammonium salt of CMC having 30 acid groups (carboxyl groups) per 100 monomers was used.

The proportion of the carbon material in the carbon paste was set to 5 mass %. The content ratio of the phenol sulfonic acid novolac resin in the carbon paste was 25 parts by mass with respect to 100 parts by mass of the carbon material. The content ratio of CMC in the carbon paste was 8 parts by mass with respect to 100 parts by mass of the carbon material. In Table 1, the carbon pastes of Examples 1 to 5 are a1 to a5, respectively. The carbon paste of Comparative Example 1 is b1.

The carbon paste was applied to solid electrolyte layer 9, and then heated at 200° C. to form carbon layer 11 (thickness of 7 μm to 10 μm at the element central part) on a surface of the solid electrolyte layer. Subsequently, a silver paste containing silver particles and a binder resin (epoxy resin) was applied onto the surface of carbon layer 11, and then the binder resin was cured by heating to form silver-paste layer 12. Cathode lead-out layer 10 composed of carbon layer 11 and silver-paste layer 12 was thus formed.

Capacitor element 2 was obtained in this manner.

(2) Assembly of Electrolytic Capacitor

Anode lead terminal 4, cathode lead terminal 5, and adhesive layer 14 were further disposed on capacitor element 2, and exterior body 3 was formed by a resin containing silica particles as a filler, whereby an electrolytic capacitor was produced. In Table 1, the electrolytic capacitors of Example 1 to 5 are A1 to A5, respectively. The electrolytic capacitor of Comparative Examples 1 is B1.

Examples 6 to 7

Carbon pastes a6 to a7 of Exampled 6 to 7 were obtained in the same manner as in the carbon paste a1 of Example 1 except that spherical natural graphite powders having the average particle sizes shown in Table 1 were used instead of the scaly natural graphite powder. Electrolytic capacitors A6 to A7 of Examples 6 to 7 were obtained in the same manner as in electrolytic capacitor A1 of Example 1 except that carbon pastes a6 to a7 were used instead of carbon paste a1.

Example 8

Carbon paste a8 of Example 8 was obtained in the same manner as in the carbon paste a1 of Example 1 except that a mixed powder (mass ratio 1:1) of a scaly natural graphite powder (average particle size 20 μm) and a scaly natural graphite powder (average particle size 20 μm) was used instead of the scaly natural graphite powder. Electrolytic capacitor A8 of Example 8 was obtained in the same manner as in electrolytic capacitor A1 of Example 1 except that carbon paste a8 was used instead of carbon paste a1.

Examples 9 to 11

Carbon pastes a9 to a11 of Examples 9 to 11 were obtained in the same manner as in carbon pastes a1 to a3 of Examples 1 to 3 except that neither the first polymer nor the second polymer was added. Electrolytic capacitors A9 to A11 of Example 9 to 11 were obtained in the same manner as in electrolytic capacitors A1 to A3 of Example 1 to 3 except that carbon pastes a9 to a11 were used instead of carbon pastes a1 to a3.

Examples 12 to 13

Carbon pastes a12 to a13 of Examples 12 to 13 were obtained in the same manner as in carbon pastes a1 to a2 of Examples 1 to 2 except that the second polymer was not added. Electrolytic capacitors A12 to A13 of Examples 12 to 13 were obtained in the same manner as in electrolytic capacitors A1 to A2 of Examples 1 to 2 except that carbon pastes a12 to a13 were used instead of carbon pastes a1 to a2.

[Evaluation of Carbon Layer]

The oxygen permeability and the surface resistivity of the carbon layer were determined by the method described above using the carbon pastes of Examples and Comparative Examples prepared as described above.

[Evaluation of Electrolytic Capacitor]

The electrolytic capacitors of Examples and Comparative Examples produced as described above were evaluated as follows.

(Initial Property)

The ESR value (mΩ) at a frequency of 100 kHz of each electrolytic capacitor was measured as an initial ESR value ($X_0$) (mΩ) with an LCR meter for four-terminal measurement under an environment of 20° C.

(Heat Resistance)

Next, the electrolytic capacitor was retained in an environment of 125° C. for 1000 hours. The ESR value ($X_1$) (mΩ) of the electrolytic capacitor after 1000 hours retainment was measured by the same method as described above. ESR change ratio R1 was determined from the following formula.

$$\text{ESR change ratio } R1 = X_1/X_0$$

(Moisture Resistance)

The electrolytic capacitor was retained in an environment of a temperature of 60° C. and a humidity of 90% for 500 hours. The ESR value ($X_2$) (mΩ) of the electrolytic capacitor after 500 hours retainment was measured by the same method as described above. ESR change ratio R2 was determined from the following formula.

$$\text{ESR change ratio } R2 = X_2/X_0$$

The evaluation results are shown in Table 1. In Table 1, the initial ESR is shown as a relative value with the initial ESR of electrolytic capacitor B1 of Comparative Example 1 taken as 100.

TABLE 1

| | | Carbon paste | | | | |
|---|---|---|---|---|---|---|
| Electrolytic | Carbon | Carbon particle | | Additive agent | | |
| capacitor No. | paste No. | Average particle size (μm) | Particle shape | First polymer | Second polymer | pH |
| A1 | a1 | 1 | Scaly | Present | Present | 5 |
| A2 | a2 | 5 | Scaly | Present | Present | 5 |
| A3 | a3 | 10 | Scaly | Present | Present | 5 |
| A4 | a4 | 15 | Scaly | Present | Present | 5 |

TABLE 1-continued

| Electrolytic capacitor No. | Carbon paste No. | | Shape | | | |
|---|---|---|---|---|---|---|
| A5 | a5 | 20 | Scaly | Present | Present | 5 |
| A6 | a6 | 20 | Spherical | Present | Present | 5 |
| A7 | a7 | 30 | Spherical | Present | Present | 5 |
| A8 | a8 | 20 | Scaly:Spherical = 1:1 | Present | Present | 5 |
| A9 | a9 | 1 | Scaly | None | None | 5 |
| A10 | a10 | 5 | Scaly | None | None | 5 |
| A11 | a11 | 10 | Scaly | None | None | 5 |
| A12 | a12 | 1 | Scaly | Present | None | 5 |
| A13 | a13 | 5 | Scaly | Present | None | 5 |
| B1 | b1 | 40 | Scaly | None | None | 5 |

| | | Evaluation | | | | |
|---|---|---|---|---|---|---|
| | | Carbon layer | | Electrolytic capacitor | | |
| Electrolytic capacitor No. | Carbon paste No. | Oxygen permeability (cc/m² · day · atm) | Surface resistivity (Ω/sq.) | Initial ESR (Index) | (Heat resistance evaluation) ESR change ratio R1 | (Moisture resistance evaluation) ESR change ratio R2 |
| A1 | a1 | 0.08 | 52 | 69 | 1.5 | 1.7 |
| A2 | a2 | 0.5 | 49 | 76 | 1.6 | 2.8 |
| A3 | a3 | 1.4 | 34 | 81 | 1.6 | 3.3 |
| A4 | a4 | 2.5 | 29 | 88 | 1.7 | 3.7 |
| A5 | a5 | 4.1 | 24 | 91 | 2.0 | 4.5 |
| A6 | a6 | 5.2 | 15 | 75 | 2.7 | 4.8 |
| A7 | a7 | 5.6 | 10 | 71 | 3.5 | 4.9 |
| A8 | a8 | 4.6 | 20 | 80 | 2.5 | 4.6 |
| A9 | a9 | 0.09 | 45 | 67 | 4.9 | 1.9 |
| A10 | a10 | 0.5 | 40 | 74 | 5.7 | 3.1 |
| A11 | a11 | 1.6 | 28 | 80 | 6.1 | 3.9 |
| A12 | a12 | 0.1 | 47 | 70 | 1.6 | 2.4 |
| A13 | a13 | 0.6 | 42 | 79 | 1.7 | 3.6 |
| B1 | b1 | 8.1 | 10 | 100 | 9.5 | 8.3 |

In the carbon layers obtained using carbon pastes a1 to a13, the surface resistivity was more than 10 Ω/sq. and less than or equal to 200 Ω/sq., and the oxygen permeability was less than or equal to 7 cc/m²·day·atm. In electrolytic capacitors A1 to A13, the initial ESR was smaller than that of electrolytic capacitor B1, and the change ratios R1 and R2 were smaller than those of electrolytic capacitor B1. That is, the heat resistance and the moisture resistance were improved as compared with electrolytic capacitor B1.

In electrolytic capacitors A1 to A3 to which the first polymer and the second polymer were added, heat resistance and moisture resistance were further improved as compared with electrolytic capacitors A9 to A11 to which neither the first polymer nor the second polymer was added. Electrolytic capacitors A12 to A13 to which the first polymer was added had significantly improved heat resistance as compared with electrolytic capacitors A9 to A10 to which the first polymer was not added. Electrolytic capacitor A5 in which scaly carbon particles were used had a further smaller oxygen permeability than electrolytic capacitor A6 in which spherical carbon particles were used.

In the carbon layer obtained using carbon paste b1, the oxygen permeability was as large as 8.1 cc/m²·day·atm, and the heat resistance and moisture resistance of electrolytic capacitor B1 deteriorated. The average particle size of the carbon particles contained in the carbon layer was as large as 40 μm, the interface resistance between the carbon layer and the solid electrolyte layer increased, and the initial ESR of electrolytic capacitor B1 increased.

INDUSTRIAL APPLICABILITY

The electrolytic capacitor of the present disclosure can suppress deterioration of the conductive polymer contained in the solid electrolyte layer and can suppress an increase in the ESR even when the electrolytic capacitor is exposed to a high-temperature atmosphere or a high-humidity atmosphere. The electrolytic capacitor can be therefore used in various applications that require low ESR.

REFERENCE MARKS IN THE DRAWINGS

1 electrolytic capacitor
2 capacitor element
3 exterior body
4 anode lead terminal
5 cathode lead terminal
6 anode body
7 dielectric layer
8 cathode part
9 solid electrolyte layer
10 cathode lead-out layer
11 carbon layer
12 silver-paste layer
13 separation layer
14 adhesive layer

The invention claimed is:

1. An electrolytic capacitor comprising a capacitor element, the capacitor element including:
   an anode body;
   a dielectric layer covering at least a part of the anode body;
   a solid electrolyte layer covering at least a part of the dielectric layer; and
   a cathode lead-out layer covering at least a part of the solid electrolyte layer, wherein:
   the cathode lead-out layer includes a conductive layer,
   the conductive layer includes carbon particles having conductivity and a first polymer having an acid group,
   the acid group includes at least one selected from the group consisting of a sulfone group and a sulfonic acid derivative, and an oxygen permeability of the conductive layer at a thickness of 10 μm is less than or equal to 7 cc/m²·day·atm.

2. The electrolytic capacitor according to claim 1, wherein a surface resistivity of the conductive layer ranges from 10 Ω/sq. to 200 Ω/sq., inclusive.

3. The electrolytic capacitor according to claim 1, wherein an average particle size of the carbon particles ranges from 0.1 μm to 30 μm, inclusive, as measured by a dynamic light scattering method.

4. The electrolytic capacitor according to claim 1, wherein the carbon particles include scaly particles.

5. The electrolytic capacitor according to claim 1, wherein a content ratio of the first polymer ranges from 1 part by mass to 5000 parts by mass, inclusive, with respect to 100 parts by mass of the carbon particles.

6. The electrolytic capacitor according to claim 1, wherein the conductive layer further includes a second polymer having water solubility, the second polymer being different from the first polymer.

7. A paste for forming a conductive layer of an electrolytic capacitor, the paste comprising:
carbon particles having conductivity;
a first polymer having an acid group; and
a dispersion medium, wherein;
the acid group includes at least one selected from the group consisting of a sulfone group and a sulfonic acid derivative, and
an oxygen permeability of the conductive layer formed by the paste at a thickness of 10 μm is less than or equal to 7 cc/m²·day·atm.

8. The paste according to claim 7, wherein a surface resistivity of the conductive layer ranges from 10 Ω/sq. to 200 Ω/sq., inclusive.

9. The paste according to claim 7, wherein an average particle size of the carbon particles ranges from 0.1 μm to 30 μm, inclusive, as measured by a dynamic light scattering method.

10. The paste according to claim 7, wherein the carbon particles include scaly particles.

11. The paste according to claim 7, wherein the paste further comprising a second polymer having water solubility, the second polymer being different from the first polymer.

12. The paste according to claim 7, wherein a content ratio of the first polymer ranges from 1 part by mass to 5000 parts by mass, inclusive, with respect to 100 parts by mass of the carbon particles.

* * * * *